July 22, 1952 A. H. INGLIS ET AL 2,604,545

PARTY LINE STATION SIGNALING SYSTEM

Filed May 19, 1950

INVENTORS A. H. INGLIS
L. E. KREBS
BY
R. O. Covell
ATTORNEY

Patented July 22, 1952 2,604,545

UNITED STATES PATENT OFFICE 2,604,545

PARTY LINE STATION SIGNALING SYSTEM

Alfred H. Inglis, Upper Montclair, and Luther E. Krebs, West Orange, N. J., assignors to Bell Telephone Laboratories, Incorporated, New York, N. Y., a corporation of New York Application May 19, 1950, Serial No. 163,002

6 Claims. (Cl. 179—87)

Figure 1:
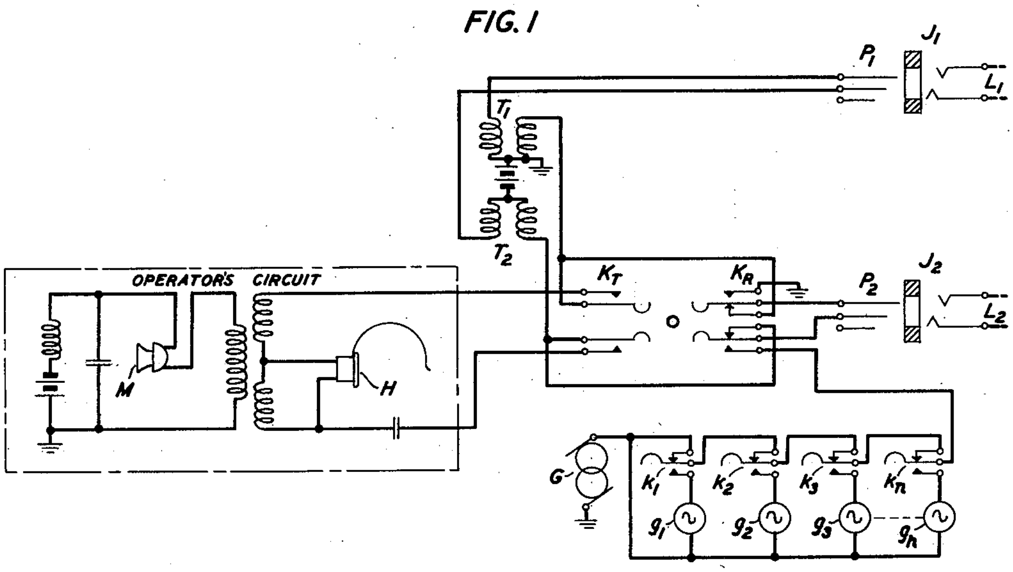

This invention relates to selective signaling systems and more particularly to improved means for telephone station signaling.

It has long been common practice to provide telephone subscribers' stations with gong-type ringers, or bells, as means for signaling the subscriber when his station is called. Because of the mechanical limitations in the bell ringer, and the considerable amount of energy required to operate the clapper, it has always been common practice to energize telephone bells with relatively high power, low frequency electrical current, the general practice being to employ ringing current having a frequency of 20 cycles per second. Although such ringers are effective in attracting a telephone subscriber's attention, this means of signaling is susceptible of improvement in a number of respects.

One unfortunate limitation of the conventional telephone bell ringer is the difficulty of providing satisfactory means for subscriber adjustment of ringer loudness. Since the mechanical operation of bell ringers is such that the clapper either strikes the gong or else it does not strike the gong, it is not satisfactory to provide electrical volume controls or rheostats for adjustment of the bell's loudness, but rather the only known means of varying bell ringer intensity are either by physically exchanging one type of gong for another, providing mechanical or acoustical damping, or by intricate means for stroke adjustment as disclosed by Patent 2,532,133, which issued November 28, 1950 to W. E. Whidden.

All conventional telephone bells, though operated by low frequency ringing current, give off a high frequency metallic ringing sound the high pitch of which is due to the necessarily limited size of the gong. Many persons consider such sounds to be harsh and unpleasant, and people with impaired hearing generally have greater difficulty in hearing such high frequency sounds than they would have in detecting sounds of a lower frequency.

Because of the considerable amount of power required to operate conventional gong-type bell ringers, a limitation has necessarily been imposed upon the number of additional or auxiliary ringers which may be bridged across the line at a subscriber's station for providing a calling signal at a plurality of locations on the subscriber's premises. Due to the smaller amount of power required to operate the signaling device of the present invention, a greater number of sounders may be bridged across the line at a subscriber's station than has heretofore been possible with conventional gong-type ringers.

Conventional means of party line station ringing ordinarily require a ground connection in addition to a pair of metallic conductors, and generally limit the number of parties which may be selectively rung to two, unless vacuum tube sets or their equivalent are employed at each station as means for providing four-party full selective ringing. Harmonic ringers as means for selective ringing of more than four parties are generally unsatisfactory because of the practical problems of supplying and maintaining large numbers of different ringer types, and also because of the possibility of ringing tone cross-talk in telephone transmission circuits due to the higher frequency ringing currents required at high power levels.

One system of multiparty selective signaling employing a distinctively tuned reed at each subscribers' station on a common party line is disclosed by the copending application of F. J. Singer and L. J. Stacy, Serial No. 73,373, filed January 28, 1949 for which Patent 2,532,125, issued on November 28, 1950. The system of that disclosure requires the provision of a cold cathode gas discharge tube, or its equivalent, at each party line subscriber's station in addition to a tuned reed and conventional ringer.

One of the objects of the present invention is to provide a simplified multiparty full selective station signaling system in which a large number of stations connected to a common party line may be individually signaled without the necessity of providing a gas discharge tube, or the like, at each station.

Another object of the invention is to provide an improved telephone station signaling system in which the gong-type bell ringer is eliminated and a more efficient electroacoustic transducer operable within the voice frequency range of signaling is substituted therefor.

Yet another object is to provide improved station signaling means which afford new and wider ranges of signaling frequencies of more pleasing tones.

A further object of the invention is a telephone station signaling system in which a simple electrical or acoustical volume control may be provided at each subscriber's station for individual adjustment by the subscriber of the calling signal loudness.

Another object of the invention is the provision of a telephone signaling system in which all of the above objects are achieved over a metallic two-conductor circuit without the necessity of a ground connection.

A still further object of the invention is a subscriber station signaling system incorporating the advantageous objects above mentioned and which can be added piecemeal to existing telephone systems and employed jointly with the existing bell-type ringers in the telephone plant, without requiring a complete change in the system but rather permitting gradual cut-over to the improved ringing circuits of the invention.

An additional advantage which may be realized by the invention is the possibility of improved and less complex facilities for revertive calling from one party line subscriber to another party on the same line. Also, a station may be signaled from the central office while its receiver is off hook, thus eliminating any need for special "howler" generators at the central office to cope with situations where the subscriber's receiver has been inadvertently removed or left off the hook.

The general objects of the invention are achieved by transmitting from the central office a relatively high power subvoice frequency calling signal in combination with a lower power narrow band signal of a selected voice frequency, and at the called subscriber's station employing the received low power voice frequency signal to operate a frequency selective tuned reed relay which modulates the higher power subvoice frequency signal and connects the modulated power output to an electro-acoustic transducer. In this manner the power which is necessary to produce a high level calling signal at an outlying station is transmitted over the connecting telephone lines at a subvoice frequency so as to avoid any possibility of signal crosstalk in adjacent lines, and at the called station the power is translated into other frequencies within the audio range and employed to produce a pleasing call signal sound. An electrical volume control may be provided at each station to afford means for subscriber adjustments of calling signal intensity.

Figure 2:
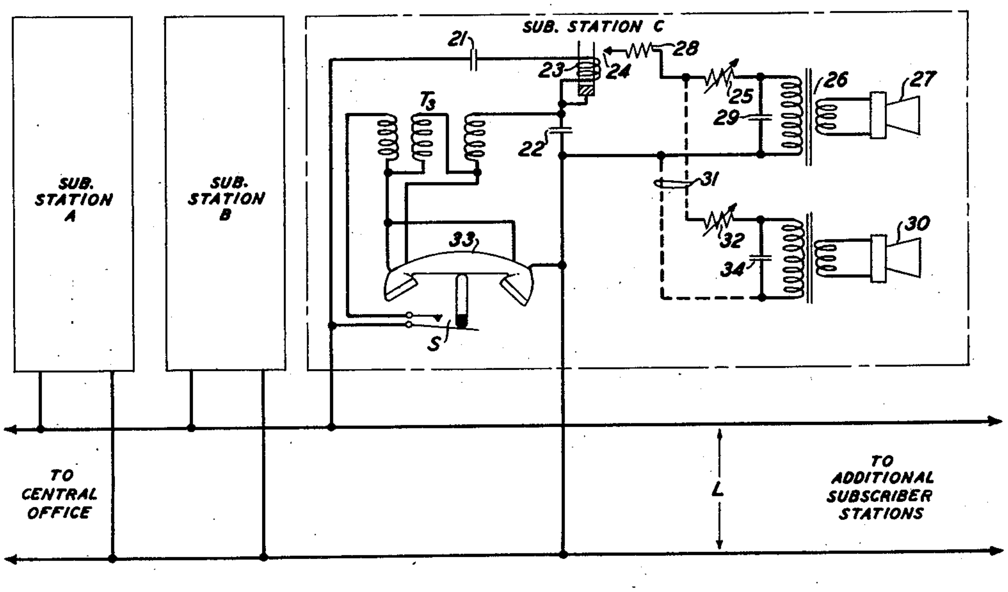

The manner in which these various objects are achieved by the invention will be better understood from a reference to the accompanying drawing and the detailed description which follows:

Fig. 1 of the drawing illustrates the essential elements of ringing supply and operators' connecting cord circuits at a central office which is here shown in its simplest form adapted for manual operation; and Fig. 2 shows a plurality of party line subscribers' stations connected to a common party line, with the essential circuit elements of one such subscriber's station being shown in detail.

It is to be understood that although the preferred embodiment of the invention herein disclosed shows its adaptation to manual switching control, the invention is not necessarily limited to use in connection with manual offices but may be employed in automatic machine switching telephone offices of either the step-by-step, panel, cross-bar, or any other type of machine switching control.

Referring now in greater detail to the disclosure of Fig. 1 we see that the ringing supply consists of a low frequency generator G which may be the conventional 20-cycle generator as now employed in most telephone offices, in connection with a plurality of higher frequency generators $g_1$ through $g_n$, each of the latter generators having associated therewith a separate key $K_1$ through $K_n$ by which any of the generators $g$ may be connected in series with the generator G. Although a series circuit is disclosed by Fig. 1, it will be understood that an alternative circuit for connecting a selected generator $g$ in parallel with the generator G is within the scope of the invention. The number of alternating-current generators $g_1$ to $g_n$ may correspond to the maximum number of subscribers' stations to be connected on any one party line, and in the preferred embodiment of the invention the alternating current from these generators may be within the frequency range of approximately 450 cycles to 850 cycles, the frequency of each generator being selected to differ from the frequencies of all the other generators and from the harmonics of their fundamental frequencies.

When one subscriber originates a call to another subscriber, whether on the same line or not, he lifts his receiver from its switchhook which closes a contact to operate a signal (not shown) at the central office, in a manner well known to the art. The central office operator responds by inserting an answering plug, $P_1$ in Fig. 1, into the indicated jack, as $J_1$ in Fig. 1, which is connected with the calling subscriber's line, as $L_1$. In order to talk with the calling party, the operator closes talking key $K_T$ which connects her operator's circuit, including transmitter M and headset receiver H, through induction coils $T_1$ and $T_2$, to the conductors of answering plug $P_1$. Upon ascertaining the designation of the called party, the operator then inserts calling plug $P_2$ into the jack, as $J_2$, connected with the called party's line, as $L_2$. To signal the called party the operator then manipulates one of the keys $K_1$ through $K_n$ corresponding to the designated number of the desired station. The ringing key $K_R$ is adapted to close whenever any one of the selected keys $K_1$—$K_n$ is operated. This applies to the connected line a signaling current comprising in combination the selected higher frequency current from the generator $g$ superimposed upon the lower frequency current from generator G. If it should be desired to signal a party whose station is not equipped for selective frequency signaling but is adapted to be rung by the conventional 20-cycle signal, then the operator merely closes ringing key $K_R$ which connects low frequency generator G directly to the calling plug $P_2$.

Referring now in greater detail to Fig. 2, we shall trace the course of the calling signal as it is received at the subscriber's station. We may assume that the operator has manipulated key $K_3$ for the purpose of signaling subscriber's station C, the circuit of which is fully disclosed in Fig. 2. The circuits of all the other subscribers' stations on the same line, as stations A and B, may be the same as that disclosed in detail for station C, but each station is provided with a differently tuned reed relay.

When the subscriber's handset is on the hook his switchhook contact is open as illustrated by S in the drawing of Fig. 2. With the switch S in this position the calling signal coming over the line from the central office is transmitted through condensers 21 and 22 to the driving coil of tuned reed relay 23. This tuned reed relay may be of the type disclosed by G. E. Perreault in Patent No. 2,502,339, which issued March 28, 1950. The reed of the relay 23 is tuned to vibrate at but one frequency and at no other. In this case we will assume that the reed relay 23 is tuned to vibrate at frequency $F_3$ which is the same as the frequency of alternating current generated by generator $g_3$ which is connected to the ringing circuit by the operator's manipulation of key $K_3$ at the central office. Thus the calling signal, which comprises the frequency $f_3$ combined with low frequency from ringing generator G, is of such a characteristic as to cause the reed relay 23 at subscriber's station C to vibrate while similar reed relays at the other party line stations such as A and B, which are each tuned to a different frequency, are not caused to vibrate by the same calling signal. When the reed relay 23 is thus energized it intermittently closes its vibrating contact 24, thereby completing a circuit to pass signaling current from one side of the line L through condenser 21, thence through relay winding 23 and vibrating contact 24, thence through variable resistor 25 and primary winding of transformer 26 back to the other side of the line, and thus to operate the electroacoustic transducer 27. The transducer 27 is a loudspeaker, preferably of the horn type, which may be incorporated into the telephone subscriber's station set in the manner disclosed by Patent 2,578,367, which issued December 11, 1951 to E. E. Mott. The resistor 28 is inserted in the circuit very close to the vibrating contact 24 for the purpose of protecting the vibrating contact from excessive sparking. Condenser 22 associated with the inductance of relay winding 23 serves to filter out the high frequency components of the calling signal as produced by the modulating action of the vibrating reed contact 24, thus preventing these high level voice frequency calling signals from feeding back into the line to cause objectionable crosstalk. Condenser 29, shunted across the primary winding of transformer 26, provides additional contact protection and is a convenient aid in controlling the quality of the acoustic signal.

The variable resistor 25 may be a simple rheostat which serves as a volume control to be adjusted by the subscriber to a suitable level of calling signal sound from transducer 27. With such a manually adjustable control for the subscriber he may condition his telephone signal device to give a loud signal to override local room noise at his premises, or whenever he may be in another room or another part of the premises some distance removed from his telephone. Contrariwise, if someone should be sleeping in a room adjoining the telephone, or if for any other reason it should be desirable to prevent a loud sound from the telephone calling signal device, the subscriber may preadjust his variable control 25 so as to introduce greater resistance in the circuit and thereby reduce the intensity of sound which may be radiated from the transducer 27. The transformer 26 is provided to reflect a suitably high impedance from the electromagnetic transducer 27 to the line. However, it will be obvious that transformer 26 may be eliminated if a transducer is employed having an internal impedance equivalent to the combination shown.

Also, one or more additional transducers as represented by 30 in Fig. 2 may be bridged across the station transducer circuit as shown by the dotted line 31, and each additional transducer may be provided with its own separate volume control 32, and shunting condenser 34. Many telephone subscribers may find it desirable to have additional calling signal transducers installed in such places as their kitchens, their basements, their garages, or any other portion of their premises which may be remote from the central location of their telephone sets. Because of the relatively small amount of power required to operate these transducers, as compared with conventional bell gongs, a greater number of them may thus be bridged to a single telephone station without impairing the operation of the station calling system.

The fixed condenser 22 in Fig. 2 is selected of a value of capacitance to present a relatively high impedance to the low frequency ringing current while offering a relatively low impedance to the higher frequency reed operating signal current. The capacitance 21 is selected of such a value as to present low impedance to both the high and low frequency signaling current and its presence in the circuit of Fig. 2 is for the sole purpose of isolating the station calling elements from any direct current which may be present on the line. If desired, condenser 21 may be omitted from the circuit.

When the subscriber lifts his handset 33 in response to a station call, his switchhook contact S as shown schematically in Fig. 2, closes contact to the primary winding of induction coil $T_3$ to connect the handset 33 with the line L and thereby establish talking condition. $T_3$ may be a conventional telephone set induction coil of a type well known in the art. Upon completion of a call the subscriber hangs up his handset 33 thereby restoring the switchhook contact to the open position illustrated by the drawing of Fig. 2.

Because the high impedance winding of tuned reed relay 23 does not materially attenuate speech signals it may remain connected across the line, as illustrated by the circuit of Fig. 2, even when the station is in talking condition. Thus the central office is enabled to call a party whose receiver has been inadvertently left off hook, and the calling indication at the subscriber's station under these circumstances is essentially the same as the normal calling signal when the receiver is properly on hook.

Referring again to Fig. 1, it will be obvious to those familiar with the telephone art that the operator's headband receiver H, microphone transmitter M, and listening key switch $K_L$ function in a well-known manner to provide supervisory service and enable the operator to talk with any subscriber who desires to originate a call.

Although the preferred embodiment of the invention herein disclosed illustrates its adaptation to fully selective signaling of party line subscribers over an all-metallic circuit, it will also be apparent that the invention may be employed advantageously for direct signaling of individual parties on private lines. The invention may also be practiced in systems employing grounded ringing, or with superimposed direct current. It is to be understood that the invention is not limited to the specific circuits of the preferred embodiment herein disclosed but that many changes and variations may be made by those skilled in the art without departing from the spirit of the invention as defined by this specification and the appended claims.

What is claimed is:

1. In a telephone system a central office having a plurality of different frequency signal sources, a communicating circuit extending from said office to an outlying subscriber's station having a tuned reed relay connected with an electroacoustic transducer through a manually adjustable impedance device, said source of signals at said office including signals of a frequency characteristic corresponding to the frequency responsive characteristics of said tuned reed relay at said subscriber's station, means at said office for selecting a combination of signals from said sources including said corresponding signal, and means for applying said combination to said communication circuit whereby said tuned reed relay at said outlying subscriber's station is operated by said corresponding signal to repetitively close its vibrating contact and thereby to complete a signaling circuit through said manually adjustable impedance device to said electroacoustic transducer.

2. A telephone station calling system comprising a central office and an outlying subscriber's station connected therewith by a communication circuit, a low frequency generator and a high frequency generator at said central office, means for combining the signals from said low frequency generator and said high frequency generator at said office, means for applying said combined signals to said communication circuit, means at said subscriber's station comprising an electroacoustic transducer, a tuned reed relay responsive to said high frequency signal to operate a vibrating contact at said station through which vibrating contact said low frequency signal is modulated by said high frequency and the modulated signal is connected to said electroacoustic transducer to produce an audible calling signal comprising said low frequency modulated by repetitive high frequency interruptions of said vibrating contact.

3. A telephone station calling system comprising a central office having a source of relatively low power signals of selected narrow band frequencies within the audible range and a source of relatively higher power lower frequency currents of substantially inaudible characteristic, communication circuits extending from said central office and connecting with outlying stations, means at said central office for combining selected signals from said low power source with currents from said higher power source and for applying said combination to any of said communication circuits, means at said outlying stations comprising a vibrating reed relay tuned to respond to said selected narrow band low power signals and to modulate said higher power low frequency currents, a low-pass filter comprising a capacitance in combination with said relay, and an electroacoustic transducer connected with a vibrating contact of said relay and with said filter in such manner that said transducer is operated by said higher power currents as modulated by passage through said vibrating contact, and high frequency components of said modulated higher power currents are restrained by said filter from entering said communication circuits.

4. In a telephone system a two-conductor party line connecting with a plurality of subscribers' stations, each of said stations comprising a distinctively tuned reed relay adapted to be operated only by a signal of frequency characteristic to which said relay is tuned, said relay at each station being tuned to a different frequency from the relays at all other stations on said party line, an electroacoustic transducer at each of said stations in electrical connection with a vibrating contact of said tuned relay thereat in such manner that said transducer is intermittently connected to said line by operation of said relay, a central office comprising a source of low frequency and a plurality of distinctive high frequency signal currents, said high frequency signal currents corresponding in number and frequency to said tuned reed relays at all of said subscribers' stations, means at said central office for applying a combination of said low frequency signal currents with any of said distinctive high frequency signal currents to said line whereby the tuned reed relay at one of said outlying stations adapted to be operated by said distinctive high frequency is energized to modulate said low frequency currents thereat and to apply the modulated signal product to said transducer.

5. A telephone station comprising a tuned vibratile relay responsive to a narrow band signal of distinctive frequency characteristic, an electroacoustic transducer responsive to a broader range of signals including said distinctive frequency and other frequencies both higher and lower than said narrow band, means connecting said transducer with said relay, and further means connecting said relay and said transducer to an external telephone line in such manner that the presence on said line of a calling signal comprising said distinctive frequency characteristic in combination with other frequencies operates said relay to complete a circuit for the passage of said calling signal through said transducer.

6. A telephone station comprising a vibrating reed relay responsive to a narrow band signal of distinctive voice frequency characteristic, an electroacoustic transducer responsive to a broader range of signals including frequencies both higher and lower than said narrow band, a variable impedance device connecting said transducer with said relay, and further means including a low-pass filter connecting said relay and said transducer to an external telephone line in such manner that the presence on said line of a calling signal comprising said distinctive voice frequency in combination with subvoice frequencies which may have substantially greater power amplitude than said voice frequency operates said relay to modulate said subvoice frequencies and apply said modulated signal to said transducer while said low-pass filter isolates high frequency components of said modulated signal from said external telephone line.

ALFRED H. INGLIS.
LUTHER E. KREBS.

REFERENCES CITED

The following references are of record in the file of this patent:

UNITED STATES PATENTS

| Number | Name | Date |
|---|---|---|
| 1,808,280 | Babcock | June 2, 1931 |
| 1,852,045 | Edwards | Apr. 5, 1932 |
| 2,108,909 | Vincent | Feb. 22, 1938 |
| 2,198,901 | Bosman | Apr. 30, 1940 |
| 2,340,798 | Deal | Feb. 1, 1944 |
| 2,353,499 | Purrington | July 11, 1944 |
| 2,400,260 | Miller | May 14, 1946 |
| 2,449,391 | Kogane | Sept. 14, 1948 |